(12) United States Patent
Hsia

(10) Patent No.: US 10,225,905 B2
(45) Date of Patent: Mar. 5, 2019

(54) SOLID-STATE LIGHTING WITH NONCOUPLED DRIVERS FREE OF ELECTRIC SHOCK HAZARD

(71) Applicant: Aleddra Inc., Renton, WA (US)

(72) Inventor: Chungho Hsia, Bellevue, WA (US)

(73) Assignee: ALEDDRA INC., Renton, WA (US)

( * ) Notice: Subject to any disclaimer, the term of this patent is extended or adjusted under 35 U.S.C. 154(b) by 0 days.

(21) Appl. No.: 16/154,707

(22) Filed: Oct. 8, 2018

(65) Prior Publication Data

US 2019/0045598 A1    Feb. 7, 2019

Related U.S. Application Data

(63) Continuation-in-part of application No. 15/947,631, filed on Apr. 6, 2018, now Pat. No. 10,123,388, which is a continuation-in-part of application No. 15/911,086, filed on Mar. 3, 2018, now Pat. No. 10,136,483, which is a continuation-in-part of application No. 15/897,106, filed on Feb. 14, 2018, now Pat. No. 10,161,616, which is a continuation-in-part of application No. 15/874,752, filed on Jan. 18, 2018, now Pat. No. 10,036,515, which is a continuation-in-part of application No.
(Continued)

(51) Int. Cl.
| | |
|---|---|
| *H05B 33/08* | (2006.01) |
| *H02J 7/00* | (2006.01) |
| *H02J 7/02* | (2016.01) |
| *H02M 1/44* | (2007.01) |

(52) U.S. Cl.
CPC ........ *H05B 33/0887* (2013.01); *H02J 7/0068* (2013.01); *H02J 7/022* (2013.01); *H02M 1/44* (2013.01); *H05B 33/0815* (2013.01)

(58) Field of Classification Search
None
See application file for complete search history.

(56) References Cited

U.S. PATENT DOCUMENTS 4,628,438 A * 12/1986 Montague ............. H02M 3/158
307/66
4,742,290 A * 5/1988 Sutphin ................... H02J 7/008
320/149
(Continued)

*Primary Examiner* — Minh D A
*Assistant Examiner* — James H Cho
(74) *Attorney, Agent, or Firm* — Han IP PLLC; Andy M. Han

(57) ABSTRACT

An LED luminaire comprises a rechargeable battery, LED array(s), noncoupled drivers, and a logic control circuit. The LED luminaire may be used to replace a fluorescent or a conventional LED lamp connected to AC mains. The noncoupled drivers comprise a charging circuit configured to charge the rechargeable battery, a first driver configured to convert a DC voltage from the rechargeable battery to light up the LED array(s) when a line voltage from the AC mains is unavailable, and a second driver configured to operate the LED array(s) when the line voltage from the AC mains is available. The logic control circuit is configured to enable or disable the first driver in proper situations and to meet regulatory requirements without operational ambiguity and safety issues. Furthermore, the charging circuit and the second driver are noncoupled, no electric shock hazard possibly occurred.

18 Claims, 3 Drawing Sheets

Related U.S. Application Data

15/836,170, filed on Dec. 8, 2017, now Pat. No. 10,021,753, which is a continuation-in-part of application No. 15/649,392, filed on Jul. 13, 2017, now Pat. No. 9,986,619, which is a continuation-in-part of application No. 15/444,536, filed on Feb. 28, 2017, now Pat. No. 9,826,595, which is a continuation-in-part of application No. 15/362,772, filed on Nov. 28, 2016, now Pat. No. 9,967,927, which is a continuation-in-part of application No. 15/225,748, filed on Aug. 1, 2016, now Pat. No. 9,743,484, which is a continuation-in-part of application No. 14/818,041, filed on Aug. 4, 2015, now Pat. No. 9,420,663, which is a continuation-in-part of application No. 14/688,841, filed on Apr. 16, 2015, now Pat. No. 9,288,867, which is a continuation-in-part of application No. 14/465,174, filed on Aug. 21, 2014, now Pat. No. 9,277,603, which is a continuation-in-part of application No. 14/135,116, filed on Dec. 19, 2013, now Pat. No. 9,163,818, which is a continuation-in-part of application No. 13/525,249, filed on Jun. 15, 2012, now Pat. No. 8,749,167.

(56) References Cited

U.S. PATENT DOCUMENTS

| | | | | |
|---|---|---|---|---|
| 6,330,176 B1 * | 12/2001 | Thrap | ............... | H02J 3/005 307/86 |
| 2009/0237919 A1 * | 9/2009 | Wang | ............ | H05B 33/0803 362/183 |
| 2013/0127362 A1 * | 5/2013 | Trainor | ............ | H02J 9/065 315/224 |

* cited by examiner

SOLID-STATE LIGHTING WITH NONCOUPLED DRIVERS FREE OF ELECTRIC SHOCK HAZARD

CROSS-REFERENCE TO RELATED APPLICATIONS

The present disclosure is part of a continuation-in-part (CIP) application of U.S. patent application Ser. No. 15/947,631, filed 6 Apr. 2018, which is part of a CIP application of U.S. patent application Ser. No. 15/911,086, filed 3 Mar. 2018, which is part of a CIP application of U.S. patent application Ser. No. 15/897,106, filed 14 Feb. 2018, which is a CIP application of U.S. patent application Ser. No. 15/874,752, filed 18 Jan. 2018 and issued as U.S. Pat. No. 10,036,515 on 31 Jul. 2018, which is a CIP application of U.S. patent application Ser. No. 15/836,170, filed 8 Dec. 2017 and issued as U.S. Pat. No. 10,021,753 on 10 Jul. 2018, which is a CIP application of U.S. patent application of Ser. No. 15/649,392 filed 13 Jul. 2017 and issued as U.S. Pat. No. 9,986,619 on 29 May 2018, which is a CIP application of U.S. patent application Ser. No. 15/444,536, filed 28 Feb. 2017 and issued as U.S. Pat. No. 9,826,595 on 21 Nov. 2017, which is a CIP application of U.S. patent application Ser. No. 15/362,772, filed 28 Nov. 2016 and issued as U.S. Pat. No. 9,967,927 on 8 May 2018, which is a CIP application of U.S. patent application Ser. No. 15/225,748, filed 1 Aug. 2016 and issued as U.S. Pat. No. 9,743,484 on 22 Aug. 2017, which is a CIP application of U.S. patent application Ser. No. 14/818,041, filed 4 Aug. 2015 and issued as U.S. Pat. No. 9,420,663 on 16 Aug. 2016, which is a CIP application of U.S. patent application Ser. No. 14/688,841, filed 16 Apr. 2015 and issued as U.S. Pat. No. 9,288,867 on 15 Mar. 2016, which is a CIP application of U.S. patent application Ser. No. 14/465,174, filed 21 Aug. 2014 and issued as U.S. Pat. No. 9,277,603 on 1 Mar. 2016, which is a CIP application of U.S. patent application Ser. No. 14/135,116, filed 19 Dec. 2013 and issued as U.S. Pat. No. 9,163,818 on 20 Oct. 2015, which is a OP application of U.S. patent application Ser. No. 13/525,249, filed 15 Jun. 2012 and issued as U.S. Pat. No. 8,749,167 on 10 Jun. 2014. Contents of the above-identified applications are incorporated herein by reference in their entirety.

BACKGROUND

Technical Field

The present disclosure relates to light-emitting diode (LED) luminaires and more particularly to an LED luminaire with noncoupled drivers auto-selected for operations with a line voltage from alternate-current (AC) mains or a direct-current (DC) voltage from a rechargeable battery without electric shock hazard and ambiguity.

Description of the Related Art

Solid-state lighting from semiconductor LEDs has received much attention in general lighting applications today. Because of its potential for more energy savings, better environmental protection (with no hazardous materials used), higher efficiency, smaller size, and longer lifetime than conventional incandescent bulbs and fluorescent tubes, the LED-based solid-state lighting will be a mainstream for general lighting in the near future. Meanwhile, as LED technologies develop with the drive for energy efficiency and clean technologies worldwide, more families and organizations will adopt LED lighting for their illumination applications. In this trend, the potential safety concerns such as risk of electric shock and fire become especially important and need to be well addressed.

In today's retrofit applications of an LED lamp to replace an existing fluorescent lamp, consumers may choose either to adopt a ballast-compatible LED lamp with an existing ballast used to operate the fluorescent lamp or to employ an AC mains-operable LED lamp by removing/bypassing the ballast. Either application has its advantages and disadvantages. In the former case, although the ballast consumes extra power, it is straightforward to replace the fluorescent lamp without rewiring, which consumers have a first impression that it is the best alternative. But the fact is that total cost of ownership for this approach is high regardless of very low initial cost. For example, the ballast-compatible LED lamps work only with particular types of ballasts. If the existing ballast is not compatible with the ballast-compatible LED lamp, the consumer will have to replace the ballast. Some facilities built long time ago incorporate different types of fixtures, which requires extensive labor for both identifying ballasts and replacing incompatible ones. Moreover, the ballast-compatible LED lamp can operate longer than the ballast. When an old ballast fails, a new ballast will be needed to replace in order to keep the ballast-compatible LED lamps working. Maintenance will be complicated, sometimes for the lamps and sometimes for the ballasts. The incurred cost will preponderate over the initial cost savings by changeover to the ballast-compatible LED lamps for hundreds of fixtures throughout a facility. In addition, replacing a failed ballast requires a certified electrician. The labor costs and long-term maintenance costs will be unacceptable to end users. From energy saving point of view, a ballast constantly draws power, even when the ballast-compatible LED lamps are dead or not installed. In this sense, any energy saved while using the ballast-compatible LED lamps becomes meaningless with the constant energy use by the ballast. In the long run, the ballast-compatible LED lamps are more expensive and less efficient than self-sustaining AC mains-operable LED lamps.

On the contrary, an AC mains-operable LED lamp does not require a ballast to operate. Before use of the AC mains-operable LED lamp, the ballast in a fixture must be removed or bypassed. Removing or bypassing the ballast does not require an electrician and can be replaced by end users. Each AC mains-operable LED lamp is self-sustaining. Once installed, the AC mains-operable LED lamps will only need to be replaced after 50,000 hours. In view of above advantages and disadvantages of both the ballast-compatible LED lamps and the AC mains-operable LED lamps, it seems that market needs a most cost-effective solution by using a universal LED lamp that can be used with the AC mains and is compatible with a ballast so that LED lamp users can save an initial cost by changeover to such an LED lamp followed by retrofitting the lamp fixture to be used with the AC mains when the ballast dies.

Furthermore, the AC mains-operable LED lamps can easily be used with emergency lighting, which is especially important in this consumerism era. The emergency lighting systems in retail sales and assembly areas with an occupancy load of 100 or more are required by codes in many cities. Occupational Safety and Health Administration (OSHA) requires that a building's exit paths be properly and automatically lighted at least ninety minutes of illumination at a minimum of 10.8 lux so that an employee with normal vision can see along the exit route after the building power becomes unavailable. This means that emergency egress lighting must operate reliably and effectively during low visibility evacuations. To ensure reliability and effectiveness of backup lighting, building owners should abide by the National Fire Protection Association's (NFPA) emergency egress light requirements that emphasize performance, operation, power source, and testing. OSHA requires most commercial buildings to adhere to the NFPA standards or a significant fine. Meeting OSHA requirements takes time and investment, but not meeting them could result in fines and even prosecution. If a building has egress lighting problems that constitute code violations, the quickest way to fix is to replace existing lamps with multi-function LED lamps that have an emergency light package integrated with the normal lighting. The code also requires the emergency lights be inspected and tested for 30 seconds once a month and at least 90 minutes once a year to ensure they are in proper working conditions at all times. It is, therefore, a motive to design an LED lamp or an LED luminaire with an emergency LED module integrated such that after installed on a ceiling or in a room, the LED lamp or the LED luminaire with the emergency LED module integrated can be individually tested for 30 seconds on site or many of such units be tested all at once as AC power is interrupted for at least 90 minutes, deactivating all the circuits each unit is connected to.

SUMMARY

A light-emitting diode (LED) luminaire comprising at least four electrical conductors, one or more LED arrays, a rechargeable battery, a first full-wave rectifier, a second full-wave rectifier coupled to the at least four electrical conductors, a first input filter, a second input filter, a charging circuit, a first driver, a second driver, and a logic control circuit is used to replace a fluorescent or a conventional LED luminaire in luminaire fixture sockets connected to alternate-current (AC) mains. The at least four electrical conductors are configured to couple to the AC mains. The first full-wave rectifier and the second full-wave rectifier are configured to respectively convert a line voltage from the AC mains into a first direct-current (DC) voltage and a second DC voltage. The first input filter and the second input filter configured to suppress electromagnetic interference (EMI) noise are respectively coupled to the first full-wave rectifier and the second full-wave rectifier. The charging circuit comprises a first transformer, a first ground reference, and a second ground reference electrically isolated from the first ground reference. The charging circuit is coupled to the first full-wave rectifier via the first input filter and configured to convert the first DC voltage into a third DC voltage that charges the rechargeable battery to reach a fourth DC voltage. The first driver comprises a dimming controllable device, an input inductor, a diode connected in series with the inductor, and an output capacitor connected between the diode and the second ground reference. The first driver is configured to receive the fourth DC voltage from the rechargeable battery and to convert the fourth DC voltage into a fifth DC voltage to light up the one or more LED arrays when the line voltage from the AC mains is unavailable. The second driver comprises a second transformer and coupled to the second full-wave rectifier via the second input filter. The second driver is configured to convert the second DC voltage into a sixth DC voltage that powers up the one or more LED arrays at full power and to meet LED luminaire efficacy requirements when the line voltage from the AC mains is available.

The logic control circuit comprises at least one transistor circuit assembly. The logic control circuit is configured to either shut down the first driver by sending a predetermined low-level signal to the dimming controllable device when the line voltage from the AC mains is available or to enable the first driver by sending a predetermined high-level signal to the dimming controllable device when the line voltage from the AC mains is unavailable. Simply put, all of the charging circuit, the first driver, the second driver, and the logic control circuit are configured to auto-select either the fifth DC voltage or the sixth DC voltage to operate the one or more LED arrays.

The at least one transistor circuit assembly comprises a first transistor circuit and a second transistor circuit. The at least one transistor circuit assembly receives both the third DC voltage and the fourth DC voltage, wherein when the line voltage from the AC mains is available, the first transistor circuit turns off the second transistor circuit, thereby generating the predetermined low-level signal to disable the first driver. When the line voltage from the AC mains is unavailable, the first transistor circuit conducts an electric current to turn on the second transistor circuit, thus creating the predetermined high-level signal to enable the first driver. Specifically, the first transistor circuit, the second transistor circuit, and the rechargeable battery are in communications with one another in a way that the first transistor circuit first compares the third DC voltage with the fourth DC voltage, then determines whether the line voltage from the AC mains is available or not, and finally controls the second transistor circuit to be switched off or switched on without ambiguity.

The logic control circuit further comprises at least one diode and at least one resistor electrically coupled between the charging circuit and the first driver. The at least one diode and the at least one resistor are configured to set up a voltage drop from the third DC voltage to the fourth DC voltage, facilitating the at least one transistor circuit assembly to determine whether the line voltage from the AC mains is available or not. In other words, the third DC voltage is always greater than the fourth DC voltage when the charging circuit is active as the line voltage from the AC mains is available. Only when the line voltage from the AC mains is unavailable, is the fourth DC voltage greater than the third DC voltage, which is a zero voltage because the charging circuit cannot operate without power. The at least one transistor circuit assembly is so designed to distinguish such a difference and to turn the first transistor circuit on or off, controlling the second transistor circuit accordingly.

The logic control circuit further comprises a clamping circuit configured to substantially maintain an amplitude of the predetermined high-level signal to operate the first driver with a constant output current, subsequently lighting up the one or more LED arrays without dimming until the fourth DC voltage becomes low enough because the rechargeable battery is used up its energy in operating the one or more LED arrays when the line voltage from the AC mains is unavailable. The logic control circuit further comprises electrical contacts configured to make a connection to electrically couple the rechargeable battery to the charging circuit, the first driver, and the logic control circuit and to operate thereof. The electrical contacts may comprise electrical contacts in a switch, a relay, and a jumper, or electrical terminals accommodated for jumper wires.

The charging circuit further comprises a first input and a first output electrically isolated from the first input by the first transformer. The first input is coupled to the first ground reference via the first input filter whereas the first output is coupled to the second ground reference. Similarly, the second driver further comprises a second input, a second output electrically isolated from the second input by the second transformer, and a third ground reference. The second input is coupled to the first ground reference whereas the second output is coupled to the third ground reference further coupled to the first ground reference via a line-bypass safety capacitor to reduce a risk of electric shock. Multiple ground references are so designed to ensure no coupling among the charging circuit, the first driver, and the second driver. In this case, a return current from the one or more LED arrays can correctly reach the second ground reference when the first driver powers up the one or more LED arrays or reach the third ground reference when the second driver powers up the one or more LED arrays, completing the energy transfer to the one or more LED arrays without an electric shock hazard.

The first driver further comprises a step-up converter with the fifth DC voltage higher than both the fourth DC voltage and a forward voltage across the one or more LED arrays to operate the one or more LED arrays without flickering. The first driver further comprises one or more current sensing resistors connected in series with the one or more LED arrays. The one or more current sensing resistors are configured to control an output current to operate the one or more LED arrays such that the one or more LED arrays consume less power when the line voltage from the AC mains is unavailable than the one or more LED arrays do when the line voltage from the AC mains is available.

The charging circuit further comprises a first step-down converter with the third DC voltage lower than the first DC voltage but higher than the fourth DC voltage, as mentioned above. The second driver further comprises a second step-down converter with the sixth DC voltage lower than the second DC voltage but higher than the forward voltage across the one or more LED arrays. The second step-down converter is configured to operate the one or more LED arrays at full power.

The at least four electrical conductors may comprise a first set of electrical conductors and a second set of electrical conductors. Each of the first full-wave rectifier and the second full-wave rectifier is respectively coupled to the first set of electrical conductors and the second set of electrical conductors. When only one of the first full-wave rectifier or the second full-wave rectifier is energized by the line voltage from the AC mains connected to one of the first set of electrical conductors and the second set of electrical conductors, the other one of the first set of electrical conductors and the second set of electrical conductors do not conduct electric current, thus no electric shock hazard possibly occurred. Besides, the first set of electrical conductors and the second set of electrical conductors may respectively be connected to an unswitched and a switched line voltage from the AC mains such that the charging circuit is coupled to the unswitched line voltage from the AC mains to charge the rechargeable battery all the time no matter whether the line voltage from the AC mains is switched off at night.

The charging circuit is coupled to the first driver via a diode to control a current flowing direction. The first driver is coupled to the one or more LED arrays via another diode, a sensing resistor, and an inductor. When the one or more LED arrays receive a driving current from the first driver, a current returned from the one or more LED arrays flows to the second ground reference, completing a power transfer from the rechargeable battery. The second driver is coupled to the one or more LED arrays directly. When the one or more LED arrays receive a driving current from the second driver, a current returned from the one or more LED arrays flows back to the second driver connected to the third ground reference, completing a power transfer from the AC mains. Such phenomena indicate that no coupling exists between the charging circuit and the second driver, thus no electric shock hazard possibly occurred.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION OF THE INVENTION

Figure 1:
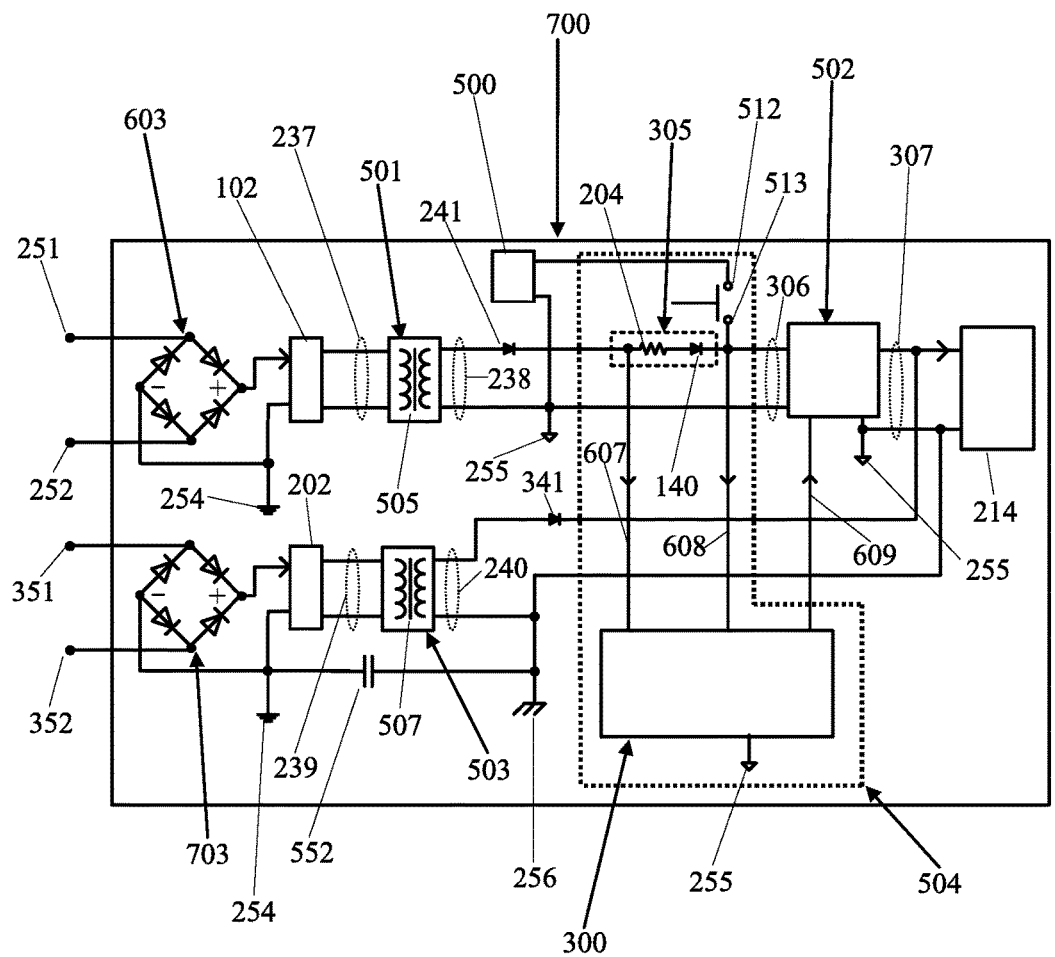
FIG. 1 is a block diagram of an LED luminaire with noncoupled drivers auto-selected for operations with a line voltage from the AC mains or a DC voltage from a rechargeable battery according to the present disclosure.

FIG. 1 is a block diagram of an LED luminaire 700 with noncoupled drivers auto-selected for operations with a line voltage from the AC mains or a DC voltage from a rechargeable battery according to the present disclosure. The LED luminaire 700 comprises one or more LED arrays 214; at least four electrical conductors 251, 252, 351, and 352; a first full-wave rectifier 603 connected to the two electrical conductors 251 and 252; a second full-wave rectifier 703 connected to the two electrical conductors 351 and 352; a rechargeable battery 500; a first input filter 102 and a second input filter 202, each configured to suppress EMI noise; a charging circuit 501; a first driver 502; a second driver 503; and a logic control circuit 504. The first full-wave rectifier 603 and the second full-wave rectifier 703 are configured to respectively convert a line voltage from the AC mains into a first DC voltage and a second DC voltage. The charging circuit 501 comprises a first transformer 505, a first input 237, a first output 238, a first ground reference 254, and a second ground reference 255 electrically isolated from the first ground reference 254. The charging circuit 501 is coupled to the first full-wave rectifier 603 via the first input filter 102 whereas the second driver 503 is coupled to the second full-wave rectifier 703 via the second input filter 102. The charging circuit 501 is configured to convert the first DC voltage into a third DC voltage for charging the rechargeable battery 500 to reach a fourth DC voltage. The first driver 502 comprises a third input 306 and a third output 307. The first driver 502 is configured to receive the fourth DC voltage from the rechargeable battery 500 and to convert the fourth DC voltage into a fifth DC voltage to operate the one or more LED arrays 214. The second driver 503 comprises a second transformer 507, a second input 239, a second output 240, the first ground reference 254 same as the first ground reference 254 the charging circuit 501 is connected to, and a third ground reference 256 electrically isolated from the first ground reference 254. The second driver 503 is configured to convert the second DC voltage into a sixth DC voltage for powering up the one or more LED arrays 214 at full power and to meet LED luminaire efficacy requirements when the input AC voltage from the AC mains is available.

In FIG. 1, the logic control circuit 504 comprises at least one pair of electrical contacts 512 and 513, a logic control module 300, and a bias circuit 305. The logic control module 300 comprises the second ground reference as the first driver 502 does to ensure communications among the first output 238, the bias circuit 305, and the first driver 502. The at least one pair of electrical contacts 512 and 513 are configured to make a connection to electrically couple the rechargeable battery 500 to the charging circuit 501, the first driver 502, and the logic control module 300 and to operate thereof. In other words, the at least one pair of electrical contacts 512 and 513 must be electrically connected so that the rechargeable battery 500 can receive energy from the charging circuit 501 via the bias circuit 305 whereas the logic control module 300 can receive a bias voltage via control connections 607 and 608 on the bias circuit 305 either to operate or to deactivate the first driver 502. When the LED luminaire 700 is intended not to be operated, for example, in a shipment, if the at least one pair of electrical contacts 512 and 513 do not exist, the rechargeable battery 500 will automatically power on the first driver 502 to operate the one or more LED arrays 214. This kind of non-intended operation with the rechargeable battery 500 discharged may create safety issues and must be prevented from occurring by disconnecting the at least one pair of electrical contacts 512 and 513. On the other hand, when the LED luminaire 700 is in use, the at least one pair of electrical contacts 512 and 513 are always electrically connected (as is the case hereinafter unless otherwise specified). The electrical contacts 512 and 513 may comprise electrical contacts in a switch, in a relay, and in a jumper, or electrical terminals accommodated for jumper wires.

In FIG. 1, the logic control circuit 504 is coupled between the charging circuit 501 and the first driver 502 and is configured to either shut down the first driver 502 via a control connection 609 when the line voltage from the AC mains is available or to enable the first driver 502 when the line voltage from the AC mains is unavailable. A bi-level control signal voltage via a control connection 609 is sent from the logic control circuit 504 to the first driver 502 to shut down or to enable the first driver 502. When the first driver 502 is disabled, the one or more LED arrays 214 are driven by the second driver 503 via the second output 240 further going through a diode 341 to control a driving current in a direction to flow into the one or more LED arrays 214 but to block any electric current backward flowing. When the line voltage from the AC mains is available, the charging circuit 501 is active, and the bias circuit 305 receives the third voltage from the charging circuit 501 via a diode 241. Then, the logic control module 300 receives the bias voltage from the bias circuit 305 via the control connections 607 and 608 on the bias circuit 305 to disable the first driver 502. When the line voltage from the AC mains is unavailable whereas the charging circuit 501 is inactive, the logic control module 300 receives the bias voltage from the bias circuit 305 via the control connections 607 and 608 on the bias circuit 305 to enable the first driver 502 that is already energized by the rechargeable battery 500. Once receiving an enable signal, the first driver 502 converts the fourth DC voltage into the fifth DC voltage to operate the one or more LED arrays 214. The bias circuit 305 comprises at least one diode 140 and at least one resistor 204 electrically coupled between the charging circuit 501 and the first driver 502. The at least one diode 140 and the at least one resistor 204 connected in series with the at least one diode 140 are configured to control a current flowing direction and to set up a voltage drop from the third DC voltage to the fourth DC voltage so that the logic control module 300 can readily determine whether the line voltage from the AC mains is available or not. In other words, the third DC voltage is always greater than the fourth DC voltage when the charging circuit 501 is active as the line voltage from the AC mains is available. Only when the line voltage from the AC mains is unavailable, is the fourth DC voltage greater than the third DC voltage. Details will be given in depicting FIG. 3.

In FIG. 1, the first transformer 505 in the charging circuit 501 is configured to electrically isolate the first input 237 from the first output 238. The first input 237 is coupled to the first ground reference 254 via the first input filter 102 whereas the first output 238 is coupled to the second ground reference 255. Similarly, the second transformer 507 in the second driver 503 is configured to electrically isolate the second input 239 from the second output 240. The second input 239 is coupled to the first ground reference 254 via the first input filter 102 whereas the second output 240 is coupled to the third ground reference 256, further coupled to the first ground reference 254 via a line-bypass safety capacitor 552 to reduce a risk of electric shock. Multiple ground references are so designed to ensure no power coupling among the charging circuit 501, the first driver 502, and the second driver 503 while maintaining communications among the charging circuit 501, the first driver 502, and the logic control circuit 504. In this case, a return current from the one or more LED arrays 214 can correctly reach the second ground reference 255 when the first driver 502 powers up the one or more LED arrays 214 or reach the third ground reference 256 when the second driver 503 powers up the one or more LED arrays 214, completing each energy transfer to the one or more LED arrays 214 without an electric shock hazard.

As mentioned in related art above, a rechargeable battery test is required by codes of many cities. The rechargeable battery test of the LED luminaire 700 must be performed to ensure that the rechargeable battery 500, the charging circuit 501, and the first driver 502 are in a working condition at all times. When the rechargeable battery test is performed, an external test switch (not shown in FIG. 1) must be used to disconnect both the first set of the electrical conductors 251 and 252 and the second set of the electrical conductors 351 and 352 to reach the line voltage from the AC mains, no matter whether they are connected to the unswitched or the switched one. Thus, there is no need to include an internal mechanism in the LED luminaire 700 to disable the charging circuit 501 and the second driver 503 when the rechargeable battery test is performed.

Figure 2:
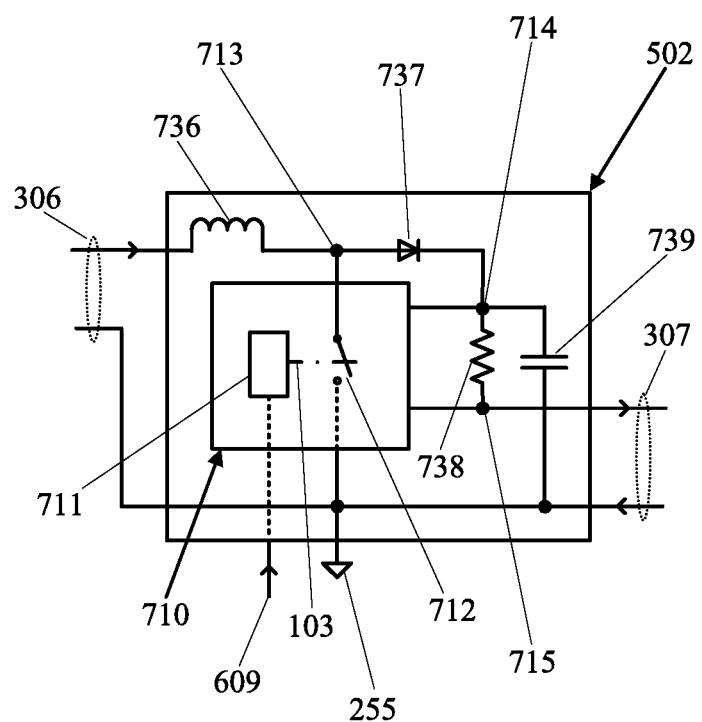
FIG. 2 is an embodiment of a logic control module according to the present disclosure.

FIG. 2 is an embodiment of the first driver according to the present disclosure. In FIG. 2, the first driver 502 comprises the third input 306, the third output 307, a dimming controllable device 710, an input inductor 736, a diode 737 connected in series with the input inductor 736 at a port 713, and an output capacitor 739 connected between a port 714 of the diode 737 and the second ground reference 255. The first driver 502 is configured to receive the fourth DC voltage from the rechargeable battery 500 and to convert the fourth DC voltage into the fifth DC voltage to light up the one or more LED arrays 214 when the line voltage from the AC mains is unavailable. The dimming controllable device 710 comprises a logic circuit 711 and a switch 712 controlled by the logic circuit 711 via a link 103. The logic circuit 711 receives a signal at the control connection 609 from the logic control module 300 (in FIG. 1). When the signal at the control connection 609 is a low-level voltage, the logic circuit 711 controls the switch 712 to be closed, which leads to a reverse bias across the diode 737, subsequently preventing the input inductor 736 from charging and discharging through the third input 306, thereby disabling the first driver 502 to light up the one or more LED arrays 214. On the other hand, when the signal at the control connection 609 is a high-level voltage, the logic circuit 711 controls the switch 712 to be opened and closed in a pulse-width modulation fashion, which leads to an alternating forward bias and reverse bias across the diode 737, subsequently enabling the input inductor 736 to charge and discharge through the third input 306, thereby building up a proper output voltage from the first driver 502 to light up the one or more LED arrays 214. The third input 306 is connected to the bias circuit 305 (FIG. 1), which is connected to both the charging circuit 501 and the rechargeable battery 500. When the line voltage from the AC mains is available, the charging circuit 501 operates not only to continuously charge the rechargeable battery 500 but also to provide an input voltage to the first driver 502 via the third input 306 to tentatively operate. Without the signal at the control connection 609 from the logic control module 300 to manage, the first driver 502 will always operate to power up the one or more LED arrays 214. In this case, the rechargeable battery 500 will never be fully charged because the first driver 502 and the one or more LED arrays 214 will drain energy from the charging circuit 501 and the rechargeable battery 500. Surely, such kind of operation fails to comply with regulatory requirements.

In FIG. 2, the first driver 502 further comprises one or more current sensing resistors 738 connected in series with the one or more LED arrays 214 through the third output 307. The one or more current sensing resistors 738 are configured to control an output current to operate the one or more LED arrays 214 such that the one or more LED arrays 214 consume less power when the line voltage from the AC mains is unavailable than the one or more LED arrays 214 do when the line voltage from the AC mains is available. As mentioned above, the first driver 502 is a step-up converter in that the first driver 502 transmits power from the third input 306 to the third output 307 in a two-step process. The input inductor 736 is served as an energy storage element. When the switch 712 is closed, the input inductor 736 stores energy with the diode 737 reverse biased to block any current from flowing to the one or more LED arrays 214. In this period, an output voltage is maintained by the output capacitor 739, which is not high enough to operate the one or more LED arrays 214. When the switch 712 is opened, the input inductor 736 reverses its polarity, leading a forward bias of the diode 737. Thus, the output current controlled by the one or more current sensing resistors 738 can flow via a port 715 to replenish the output capacitor 739 and to boost an output voltage at the third output 307 greater than an input voltage at the third input 306.

Figure 3:
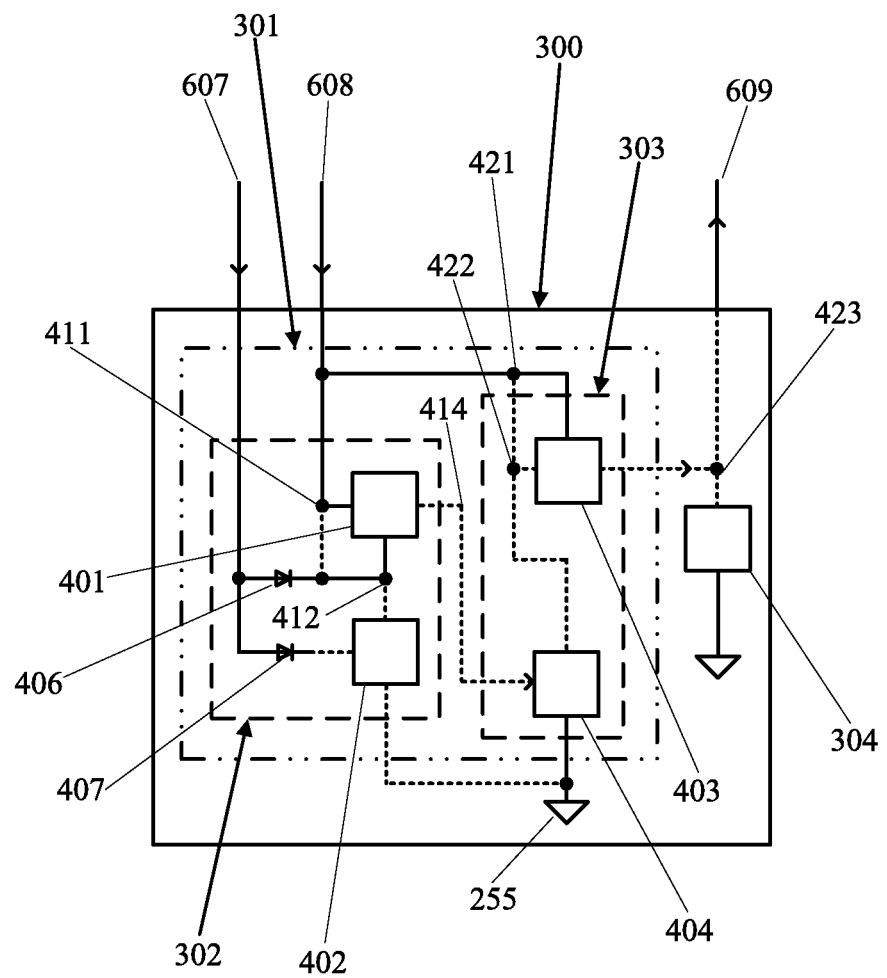
FIG. 3 is an embodiment of a first driver according to the present disclosure.

FIG. 3 is an embodiment of a logic control module according to the present disclosure. In FIG. 3, the logic control module 300 comprises at least one transistor circuit assembly 301 and a clamping circuit 304. The logic control module 300 is configured to either shut down the first driver 502 by sending a predetermined low-level signal via the control connection 609 to the dimming controllable device 710 (in FIG. 2) when the line voltage from the AC mains is available or to enable the first driver 502 by sending a predetermined high-level signal to the dimming controllable device 710 when the line voltage from the AC mains is unavailable. Simply put, all of the charging circuit 501, the first driver 502, the second driver 503, and the logic control circuit 504 are configured to auto-select either the fifth DC voltage or the sixth DC voltage to operate the one or more LED arrays 214.

In FIG. 3, the at least one transistor circuit assembly 301 comprise a first transistor circuit 302 and a second transistor circuit 303. The at least one transistor circuit assembly 301 receives both the third DC voltage and the fourth DC voltage respectively from an input and an output voltages of the bias circuit 305 via the control connections 607 and 608, wherein when the line voltage from the AC mains is available, the first transistor circuit 302 turns off the second transistor circuit 303, thereby generating the predetermined low-level signal to disable the first driver 502. When the line voltage from the AC mains is unavailable, the first transistor circuit 302 conducts an electric current to turn on the second transistor circuit 303, thus creating the predetermined high-level signal to enable the first driver 502. Specifically, the first transistor circuit 302, the second transistor circuit 303, and the rechargeable battery 500 are electrically coupled in a way that the first transistor circuit 302 first compares the third DC voltage with the fourth DC voltage, then determines whether the line voltage from the AC mains is available or not, and finally controls the second transistor circuit 303 to be switched off or switched on without ambiguity.

As depicted in FIG. 1, the at least one diode 140 and the at least one resistor 204 in the bias circuit 305 are electrically coupled between the charging circuit 501 and the first driver 502. The at least one diode 140 and the at least one resistor 204 are used to control a current flowing direction and to set up a voltage drop from the third DC voltage to the fourth DC voltage so that the at least one transistor circuit assembly 301 in FIG. 3 can readily determine whether the line voltage from the AC mains is available or not. Because the voltage drop exists between the two ends of the bias circuit 305, the third DC voltage is always greater than the fourth DC voltage when the charging circuit 501 is active as the line voltage from the AC mains is available. Only when the line voltage from the AC mains is unavailable, is the fourth DC voltage greater than the third DC voltage. The at least one transistor circuit assembly 301 is so designed to distinguish such a difference and to turn the first transistor circuit 302 on or off, subsequently controlling the second transistor circuit 303 on or off. The logic control module 300 further comprises a clamping circuit 304 configured to substantially maintain an amplitude of the predetermined high-level signal to operate the first driver 502 with a constant output current, subsequently lighting up the one or more LED arrays 214 without dimming until the fourth DC voltage becomes low enough because the rechargeable battery 500 is used up its energy in operating the one or more LED arrays 214 when the line voltage from the AC mains is unavailable. The clamping circuit 304 may comprise a Zener diode to maintain the amplitude of the predetermined high-level signal to operate the first driver 502.

In FIG. 3, the first transistor circuit 302 comprises a first transistor 401, a second transistor 402, and at least two diodes 406 and 407. The first transistor 401 comprises a first input port 411 and a second input port 412. The first input port 411 receives the fourth DC voltage via the control connection 608 from the bias circuit 305 (in FIG. 1) whereas the second input port 412 receives the third DC voltage via the control connection 607 from the bias circuit 305 and further via the diode 406. In FIG. 3, a dash line between the first input port 411 and the second input port 412 represents a bias circuit to properly operate the first transistor 401. The second transistor 402 receives the third DC voltage via the control connection 607 from the bias circuit 305 and further via the diode 407. When the line voltage from the AC mains is available, the third DC voltage is always greater than the fourth DC voltage, as mentioned above. The first transistor 401 is biased to be switched off by voltages at the first input port 411 and the second input port 412 whereas the second transistor 402 conducts to limit electric current. The second transistor circuit 303 comprises a third transistor 403 and a fourth transistor 404. The third transistor 403 comprises a third input port 421 and a fourth input port 422, connected in a dash line to represent a bias circuit for the third transistor 403 to operate. The third input port 421 receives the fourth DC voltage via the control connection 608 from the bias circuit 305 (in FIG. 1) whereas the fourth input port 422 also couples the fourth DC voltage via the bias circuit (the dash line shown in FIG. 3). The fourth transistor 404 receives a voltage 414 from the first transistor 401. When the line voltage from the AC mains is unavailable, the fourth DC voltage from the control connection 608 appears at the first input port 411 whereas a zero voltage from the control connection 607 appears at the second input port 412. In this case, the first transistor 401 is switched on to turn on the fourth transistor 404 and further to turn on the third transistor 403. A voltage then appears at an output port 423 of the third transistor 403. The clamping circuit 304 is coupled to the output port 423 to clamp the predetermined high-level voltage and to enable the first driver 502 via the control connection 609. When the line voltage from the AC mains is available, the fourth DC voltage from the control connection 608 appears at the first input port 411 whereas the third DC voltage from the control connection 607 appears at the second input port 412. The third DC voltage is greater than the fourth DC voltage. Thus, the first transistor 401 is turned off to turn off the fourth transistor 404 and further to turn off the third transistor 403. No voltage appears at the output port 423 of the third transistor 403. The clamping circuit 304 is coupled to the output port 423 to maintain the predetermined low-level voltage and to disable the first driver 502 via the control connection 609.

Whereas preferred embodiments of the present disclosure have been shown and described, it will be realized that alterations, modifications, and improvements may be made thereto without departing from the scope of the following claims. Another kind of schemes with noncoupled drivers adopted in an LED-based luminaire using various kinds of combinations to accomplish the same or different objectives could be easily adapted for use from the present disclosure.

Accordingly, the foregoing descriptions and attached drawings are by way of example only, and are not intended to be limiting.

What is claimed is:

1. A light-emitting diode (LED) luminaire, comprising:
   at least four electrical conductors configured to couple to alternate-current (AC) mains;
   one or more LED arrays with a forward voltage across the one or more LED arrays;
   a rechargeable battery;
   a first full-wave rectifier and a second full-wave rectifier coupled to the at least four electrical conductors and configured to respectively convert a line voltage from the AC mains into a first direct-current (DC) voltage and a second DC voltage;
   a first input filter and a second input filter respectively coupled to the first full-wave rectifier and the second full-wave rectifier, the first input filter and the second input filter configured to suppress an electromagnetic interference (EMI) noise;
   a charging circuit comprising a first transformer, a first ground reference, and a second ground reference electrically isolated from the first ground reference, the charging circuit coupled to the first full-wave rectifier via the first input filter and configured to convert the first DC voltage into a third DC voltage that charges the rechargeable battery to reach a fourth DC voltage;
   a first driver comprising a dimming controllable device, an input inductor, a diode connected in series with the input inductor, and an output capacitor connected between the diode and the second ground reference, the first driver configured to receive the fourth DC voltage from the rechargeable battery and to convert the fourth DC voltage into a fifth DC voltage to light up the one or more LED arrays when the line voltage from the AC mains is unavailable;
   a second driver comprising a second transformer and coupled to the second full-wave rectifier via the second input filter, the second driver configured to convert the second DC voltage into a sixth DC voltage that powers up the one or more LED arrays at full power and to meet LED luminaire efficacy requirements when the line voltage from the AC mains is available; and
   a logic control circuit comprising at least one transistor circuit assembly configured to either shut down the first driver by sending a predetermined low-level signal to the dimming controllable device when the line voltage from the AC mains is available or to enable the first driver by sending a predetermined high-level signal to the dimming controllable device when the line voltage from the AC mains is unavailable,
   wherein:
   the charging circuit, the first driver, the second driver, and the logic control circuit are configured to auto-select either the fifth DC voltage or the sixth DC voltage to operate the one or more LED arrays; and
   when a rechargeable battery test is performed, both the first full-wave rectifier and the second full-wave rectifier are inactivated to disable both the charging circuit and the second driver.

2. The LED luminaire of claim 1, wherein the at least one transistor circuit assembly comprises a first transistor circuit and a second transistor circuit, wherein the at least one transistor circuit assembly receives both the third DC voltage and the fourth DC voltage, and wherein when the line voltage from the AC mains is available, the first transistor circuit turns off the second transistor circuit, thereby generating the predetermined low-level signal.

3. The LED luminaire of claim 2, wherein when the line voltage from the AC mains is unavailable, the first transistor circuit conducts an electric current to turn on the second transistor circuit, thereby generating the predetermined high-level signal.

4. The LED luminaire of claim 2, wherein the first transistor circuit comprises a first transistor, a second transistor, and a first diode, wherein the first transistor receives both the third DC voltage via the first diode and the fourth DC voltage, and wherein when the line voltage from the AC mains is available, the first transistor is turned off in a way to turn off the second transistor circuit, thereby generating the predetermined low-level signal.

5. The LED luminaire of claim 2, wherein the second transistor circuit comprises a third transistor and a fourth transistor, wherein the third transistor receives the fourth DC voltage, wherein the fourth transistor receives a voltage from the first transistor circuit, and wherein when the line voltage from the AC mains is unavailable, the third transistor is turned on so as to generate the predetermined high-level signal.

6. The LED luminaire of claim 2, wherein the first transistor circuit, the second transistor circuit, and the rechargeable battery are in communications with one another in a way that the first transistor circuit first compares the third DC voltage with the fourth DC voltage, then determines whether the line voltage from the AC mains is available or not, and finally controls the second transistor circuit to be switched off or switched on without ambiguity.

7. The LED luminaire of claim 1, wherein the logic control circuit further comprises at least one diode and at least one resistor connected in series with the at least one diode, wherein the at least one diode and the at least one resistor are electrically coupled between the charging circuit and the first driver, and wherein the at least one diode and the at least one resistor are configured to control a current flowing direction and to set up a voltage drop from the third DC voltage to the fourth DC voltage so that the at least one transistor circuit assembly can readily determine whether the line voltage from the AC mains is available or not.

8. The LED luminaire of claim 1, wherein the logic control circuit further comprises a clamping circuit configured to substantially maintain an amplitude of the predetermined high-level signal to operate the first driver with a constant output current, subsequently lighting up the one or more LED arrays without dimming until the fourth DC voltage becomes low enough because the rechargeable battery is used up its energy to operate the one or more LED arrays when the line voltage from the AC mains is unavailable.

9. The LED luminaire of claim 1, wherein the logic control circuit further comprises at least one pair of electrical contacts configured to electrically couple the rechargeable battery to the charging circuit, the first driver, and the logic control circuit and to operate thereof.

10. The LED luminaire of claim 9, wherein the at least one pair of electrical contacts comprise electrical contacts in a switch, a relay, and a jumper, or electrical terminals accommodated for jumper wires.

11. The LED luminaire of claim 1, wherein the charging circuit further comprises a first input and a first output electrically isolated from the first input by the first transformer, wherein the first input is coupled to the first ground reference via the first input filter, and wherein the first output is coupled to the second ground reference.

12. The LED luminaire of claim 1, wherein the second driver further comprises a second input, a second output electrically isolated from the second input by the second transformer, and a third ground reference, wherein the second input is coupled to the first ground reference via the second input filter, and wherein the second output is coupled to the third ground reference, further coupled to the first ground reference via a line-bypass safety capacitor to reduce a risk of electric shock.

13. The LED luminaire of claim 1, wherein the first driver further comprises a step-up converter with the fifth DC voltage higher than both the fourth DC voltage and the forward voltage across the one or more LED arrays to operate the one or more LED arrays without flickering.

14. The LED luminaire of claim 1, wherein the first driver further comprises one or more current sensing resistors connected in series with the one or more LED arrays, the one or more current sensing resistors configured to control an output current to operate the one or more LED arrays such that the one or more LED arrays consume less power when the line voltage from the AC mains is unavailable than the one or more LED arrays do when the line voltage from the AC mains is available.

15. The LED luminaire of claim 1, wherein the charging circuit further comprises a first step-down converter with the third DC voltage lower than the first DC voltage but higher than the fourth DC voltage.

16. The LED luminaire of claim 1, wherein the second driver further comprises a second step-down converter with the sixth DC voltage lower than the second DC voltage but higher than the forward voltage across the one or more LED arrays and wherein the second step-down converter is configured to operate the one or more LED arrays at full power.

17. The LED luminaire of claim 1, wherein the at least four electrical conductors comprise two sets of electrical conductors and wherein each of the first full-wave rectifier and the second full-wave rectifier is respectively coupled to one of the two sets of electrical conductors.

18. The LED luminaire of claim 17, wherein when only one of the first full-wave rectifier or the second full-wave rectifier is energized by the line voltage from the AC mains connected to one of the two sets of electrical conductors, the other one of the two sets of electrical conductors do not conduct electric current, thus no electric shock hazard possibly occurred.

* * * * *